US010155469B1

(12) United States Patent
Gomez Ramirez (10) Patent No.: US 10,155,469 B1
(45) Date of Patent: Dec. 18, 2018

(54) ADJUSTMENT ASSEMBLY FOR VEHICLE LIGHTS HAVING BRACKET CONNECTED TO A SUPPORT MEMBER VIA A PLURALITY OF CONNECTORS, EACH CONNECTOR HAVING A BODY AND A CONNECTOR HEAD THAT ARTICULATES WITHIN A SOCKET

(71) Applicant: Valeo North America, Inc., Troy, MI (US)

(72) Inventor: Jose Alberto Gomez Ramirez, Columbus, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/624,181

(22) Filed: Jun. 15, 2017

(51) Int. Cl.
*B60Q 1/068* (2006.01)
*B60Q 1/04* (2006.01)
*F21S 41/19* (2018.01)

(52) U.S. Cl.
CPC ........... *B60Q 1/068* (2013.01); *B60Q 1/0483* (2013.01); *F21S 41/192* (2018.01)

(58) Field of Classification Search
CPC .. B60Q 1/068; B60Q 1/0683; B60Q 2200/32; B60Q 1/045; B60Q 1/0441; B60Q 1/0408; B60Q 1/0483; F21S 41/192
See application file for complete search history.

(56) References Cited

U.S. PATENT DOCUMENTS

| 5,011,322 A | 4/1991 | Schauwecker |
| 7,168,879 B2 | 1/2007 | Bertram et al. |
| 9,120,422 B2 * | 9/2015 | King ............... B60Q 1/0683 |
| 9,157,596 B2 * | 10/2015 | Tachiiwa ............ B60Q 1/06 |
| 2002/0114660 A1 | 8/2002 | Burton |
| 2017/0008443 A1 * | 1/2017 | Burton ............... B60Q 1/0408 |

FOREIGN PATENT DOCUMENTS

| EP | 0 902 198 A2 | 3/1999 |
| JP | 2015-182757 A | 10/2015 |

* cited by examiner

Primary Examiner — Robert J May
(74) Attorney, Agent, or Firm — Oblon, McClelland, Maier & Neustadt, L.L.P.

(57) ABSTRACT

An adjustment assembly to support vehicle lights including a bracket that supports the vehicle lights with a plurality of bracket housings, a support structure that articulatably supports the bracket with a plurality of support housings, a plurality of sockets that is inserted into the plurality of bracket housings. Each socket of the plurality of sockets having a cavity seat, and a cavity sink that opens on the cavity seat, and a connector that articulatably connects the bracket and the socket. Each connector of the plurality of connectors having a connector body, a connector neck that protrudes from the connector body, and a connector head that surmounts the connector neck, wherein the connector head is manually insertable into the cavity seat to provide an articulation point, the neck articulates within the cavity sink through the articulation point, and the connector body is manually insertable into each support housing.

20 Claims, 9 Drawing Sheets

ADJUSTMENT ASSEMBLY FOR VEHICLE LIGHTS HAVING BRACKET CONNECTED TO A SUPPORT MEMBER VIA A PLURALITY OF CONNECTORS, EACH CONNECTOR HAVING A BODY AND A CONNECTOR HEAD THAT ARTICULATES WITHIN A SOCKET

BACKGROUND

Field of the Disclosure

The present disclosure relates to an adjusting assembly and in particular to an automotive light adjusting assembly.

Description of the Related Art

Tasks of mounting and/or assembling a plurality of pieces together in assembly lines can be cumbersome and expensive as such tasks can require tools, operators with dexterity, time, and/or mistake proofing processes, e.g. poka-yoke processes. This is particularly relevant for automotive industry and notably in adjustment systems for vehicle lights that can rely on a large number of small parts that interact between each other and require precision assembly so as to limit accumulation of variations between parts that may exceed tolerances. Particularly, in such adjustment systems for vehicle lights, exceeding tolerances may significantly affect functions of the adjustment systems and impede the accurate positioning, setting, and/or calibration of the vehicle lights that may have to follow strict regulations.

Conventional adjustment systems for vehicle lights that rely on a multitude of parts articulated between each other and affixed between each other via fastening devices, e.g. screws, bolts, and/or glue, have been adopted. Although such conventional adjustment systems are widely used, they present important drawbacks. Notably, such conventional adjustment systems can require the use of tools, e.g. screw drivers, and wrenches, to fasten the fastening devices which can be cumbersome and time consuming due to space and/or accessibility limitations often present in lighting systems for automobiles, e.g. head light housings, as well as power source requirements to operate the tools.

In addition, the use of the fastening devices to assemble the conventional adjustment systems can lead to misfit and/or failure of the conventional adjustment systems. For example, if the fastening devices are not inserted correctly, e.g. not straight, the conventional adjustment systems may not be adequately articulated and may fail in correctly positioning the lights of the vehicle. In another example, if the fastening devices are over or under tightened, elements of the adjustment systems in which the fastening devices are inserted can become loose, bent or even broken and render the adjustment systems inoperable.

Thus, an adjustment system for vehicle lights solving the aforementioned limitations is desired.

SUMMARY

Accordingly, the object of the present disclosure is to provide an adjustment system for vehicle light assembly that addresses the above mentioned limitations.

The adjustment system of the present disclosure provides an improved assembly by relying on a connector that can be mounted between parts with the bare hand and without improper manipulations.

In one non-limiting illustrative example, an adjustment assembly to support vehicle lights is presented. The adjustment assembly to support vehicle lights includes a bracket that supports the vehicle lights with a plurality of bracket housings, a support structure that articulatably supports the bracket with a plurality of support housings, a plurality of sockets that is inserted into the plurality of bracket housings, each socket of the plurality of sockets including a cavity seat, and a cavity sink that opens on the cavity seat, and a plurality of connectors that articulatably connects the plurality of sockets and the plurality of support housings, each connector of the plurality of connectors including a connector body, a connector neck that protrudes from the connector body, and a connector head that surmounts the connector neck, wherein the connector head is manually insertable into the cavity seat to provide an articulation point, the neck articulates within the cavity sink through the articulation point, and the connector body is manually insertable into each support housing of the plurality of support housings.

In one aspect, the connector includes a plurality of connector flanges that protrudes radially from the connector body.

In another aspect, the plurality of connector flanges includes a first connector flange positioned at a first distance from a terminal end of the connector body, a second connector flange positioned at a second distance from the first connector flange, and a third connector flange positioned at a third distance from the second connector flange, wherein the first distance is substantially equal to the second distance the first and the second distance is smaller than the third distance to enhance gripping between the support housing and the connector body and air evacuation when the connector body is inserted into the support housing.

In another aspect, the second distance is at least two times smaller than the third distance.

In another aspect, the connector body further includes a plurality of support walls extending between each connector flange of the plurality of connector flanges.

In another aspect, the connector further includes a pair of groove extending along the connector body to facilitate air evacuation when the connector body is inserted into the support housing.

In another aspect, the connector further includes a connector ring positioned between the terminal end and a first connector flange of the plurality of flanges that enhances gripping between the support housing and the connector.

In another aspect, the connector ring has a predetermined play between an internal diameter of the connector ring and an external diameter of the connector body that enhances gripping between the connector and the support housing.

In another aspect, the connector ring has a ring edge substantially sharp that provides biting between the connector and the support housing.

In one non-limiting illustrative example, an adjustment assembly to support vehicle lights is presented. The adjustment assembly to support vehicle lights includes a bracket that supports the vehicle lights with a bracket housings, a support structure that articulatably supports the bracket with a plurality of support housings, a plurality of sockets that is inserted into the plurality of support housings, each socket of the plurality of sockets including a cavity seat, and a cavity sink that opens to the cavity seat, and a plurality of connectors that articulatably connects the plurality of sockets and the plurality of support housings, the connector including a connector body, a connector shoulder that surmounts the connector body, a connector neck that protrudes from the connector shoulder, and a connector head that surmounts the connector neck, wherein the connector head is manually insertable into the cavity seat to provide an articulation point, the neck moves within the cavity sink through the articulation point, the connector shoulder is seatable on each support housing of the plurality of support housings, and the connector body is manually insertable into the support housing.

In one aspect, the connector body includes a plurality of connector flanges that protrudes radially from the connector body.

In another aspect, the plurality of connector flanges includes a first connector flange positioned at a first distance from a terminal end of the connector body, a second connector flange positioned at a second distance from the first connector flange, and a third connector flange positioned at a third distance from the second connector flange, wherein the first distance is substantially equal to the second distance the first and the second distance is smaller than the third distance to enhance gripping between the support housing and the connector body and air evacuation when the connector body is inserted into the support housing.

In another aspect, the connector further includes a pair of groove extending from a terminal end of the connector body up to the shoulder to facilitate air evacuation when the connector body is inserted into the support housing.

In another aspect, the connector shoulder has a first surface substantially flat that seats on a bore of the support housing and stops the insertion of the connector body into the support housing.

In another aspect, the connector shoulder has a second surface opposite to the first surface that has a flared shaped to provide ergonomic comfort when an operator inserts the connector into the support housing.

In one non-limiting illustrative example, an adjustment assembly to support vehicle lights is presented. The adjustment assembly to support vehicle lights includes a bracket that supports the vehicle lights with a plurality of bracket housings, a support structure that articulatably supports the bracket with a plurality of support housings, a plurality of sockets that is inserted into the plurality of bracket housings, each socket of the plurality of sockets including a cavity seat, and a cavity sink that opens to the cavity seat, and a plurality of connectors that articulatably connects the plurality of sockets and the plurality of support housings, each connector of the plurality of connectors including a connector foot, a connector body that surmounts the connector foot, a connector shoulder that surmounts the connector body, a connector neck that protrudes from the connector shoulder, and a connector head that surmounts the connector neck, wherein the connector head is manually insertable into the cavity seat to provide an articulation point, the neck moves within the cavity sink through the articulation point, the connector shoulder is seatable on each support housing of the plurality of support housings, and the connector foot and the connector body, are manually insertable into the support housing.

In one aspect, the connector body includes a plurality of connector flanges that protrudes radially from the connector body.

In another aspect, the plurality of connector flanges includes a first connector flange positioned at a first distance from the connector foot, a second connector flange positioned at a second distance from the first connector flange, and a third connector flange positioned at a third distance from the second connector flange, wherein the second distance is higher than the first and the third distance is higher than the second distance to enhance gripping between the bracket housing and the connector body and air evacuation when the connector body is inserted into the support housing.

In another aspect, the connector foot includes a pair of support walls that cross each other and provides support for the connector foot.

In another aspect, each support wall of the pair of support wall has a semi-spheroidal shape to facilitate the insertion of the connector into the support housing.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1A:
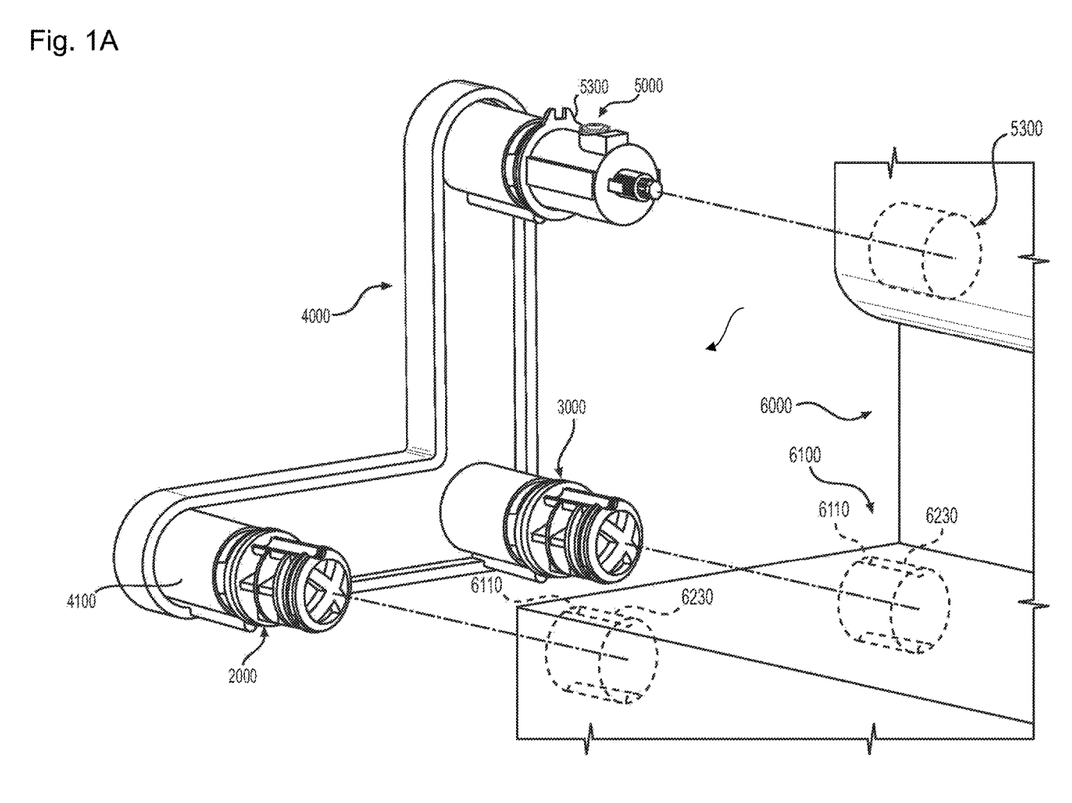
FIG. 1A is a perspective exploded view of an adjustment assembly, according to certain aspects of the disclosure.
Figure 1B:
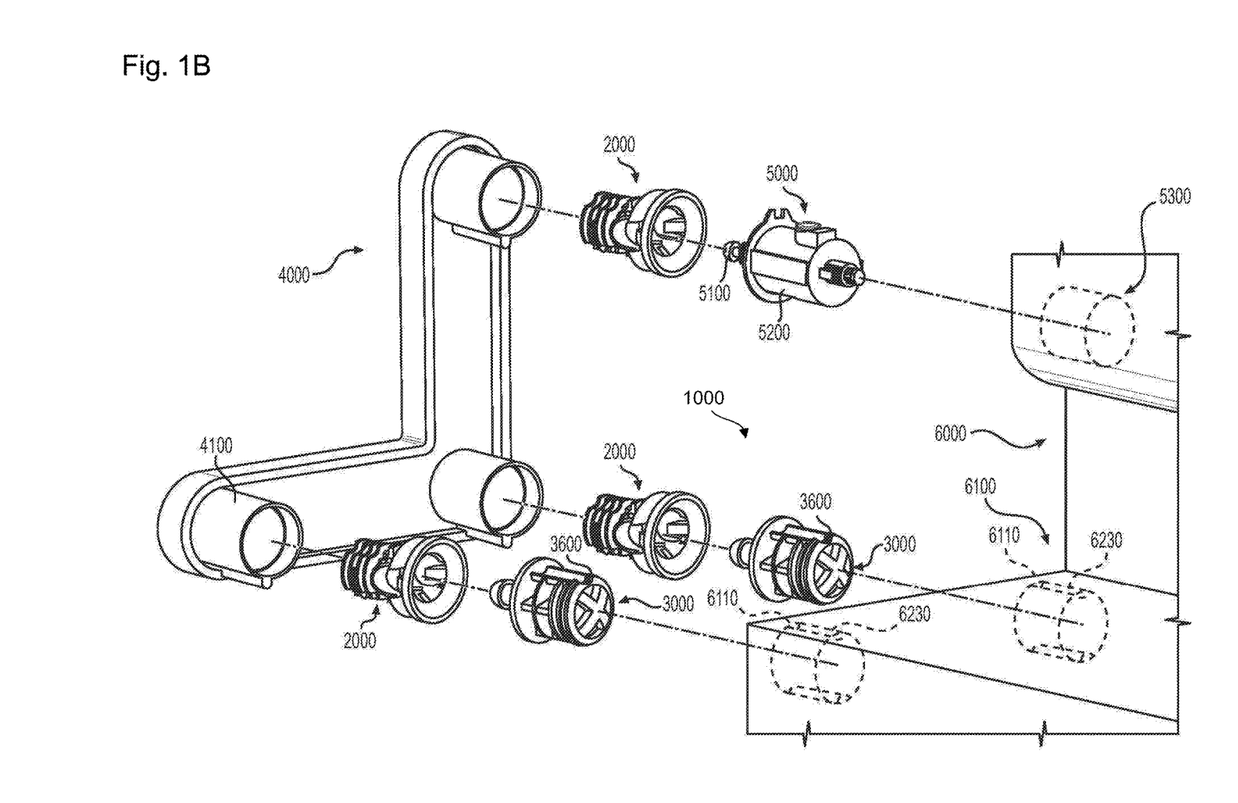
FIG. 1B is a perspective assembled view of the adjustment assembly, according to certain aspects of the disclosure.

FIGS. 1A-1B are a perspective exploded and assembled views of an adjustment assembly 1000, according to certain aspects of the disclosure.

The adjustment assembly 1000 can include a bracket 4000, a plurality of sockets 2000 inserted in the bracket 4000, a support 6000, and a plurality of connectors 3000 inserted into the plurality of sockets 2000 and the support 6000.

The plurality of connectors 3000 articulatably connects the bracket 4000 and the support 6000 through the plurality of sockets 2000 and provides each an articulation point between the plurality of brackets 4000 and the plurality of sockets 2000. The bracket 4000 can support automotive light equipment that requires adjustment, e.g. light-emitting diode (LED) assemblies, halogen lamp assemblies, or the like, while the support 6000 can provide a fixed structure from which at least one socket of the plurality of sockets 2000 can be actuated, e.g. translated forward and/or backward, by an operator to articulate the bracket 4000 around the articulation points between the plurality of connectors 3000 and the plurality of sockets 2000 to adjust positioning of the light equipment. The articulation of the at least one socket 2000 can rely on an articulation mechanism 5000, e.g. worm screw 5100 driven by a motor 5200, inserted partially or completely in the support 6000 via an articulation housing 5300 of the, to be actuated, e.g. translated forward and/or backward, by an operator.

Each connector of the plurality of connectors 3000 is elaborated to minimize manipulation complexity and/or incorrectness that can arise when the connector 3000 is mounted onto the support 6000. For example, the connector 3000 is elaborated to provide an insertion into a support housing 6100 of the support 6000 that limit the use of tools and simply require an operator to manually press the connector 3000 in the support housing 6100 of the support 6000. The connector 3000 is further elaborated to minimize the number of elements that need to be used, and manipulated to articulatably connect the bracket 4000 and the socket 2000 as the connector 3000 can be made from one single piece and do not require additional parts and/or elements, e.g. fastening devices. In addition, the connector 3000 provides an assurance that the connector 3000 is inserted in the support housing 6100 of the support 6000 following predefined tolerance conditions, e.g. the connector 3000 is inserted in the support housing 6100 of the support 6000 without being over or under tightened, or tilted.

Figure 2A:
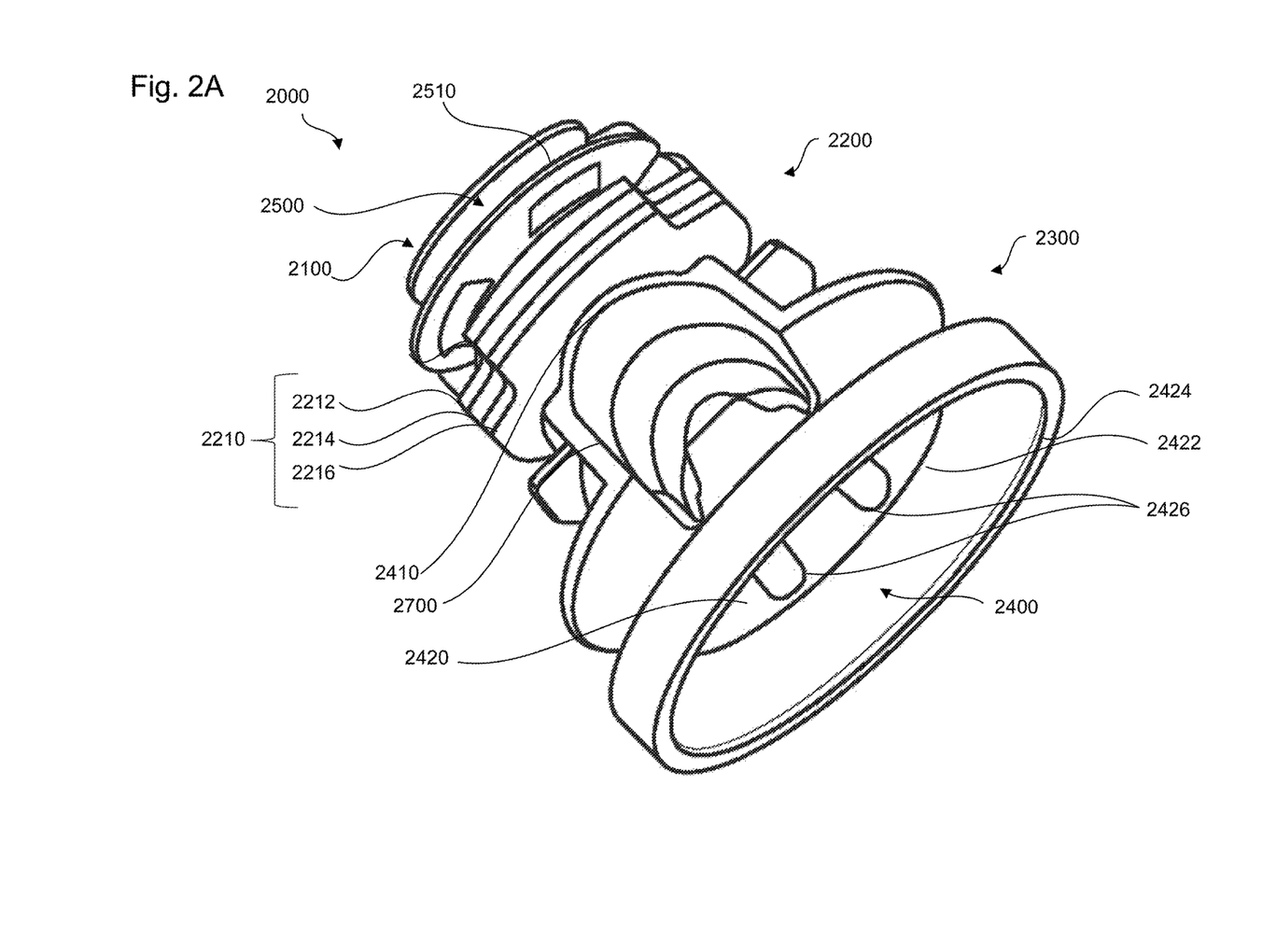
FIG. 2A is a perspective view of a socket of the adjustment assembly, according to certain aspects of the disclosure.
Figure 2B:
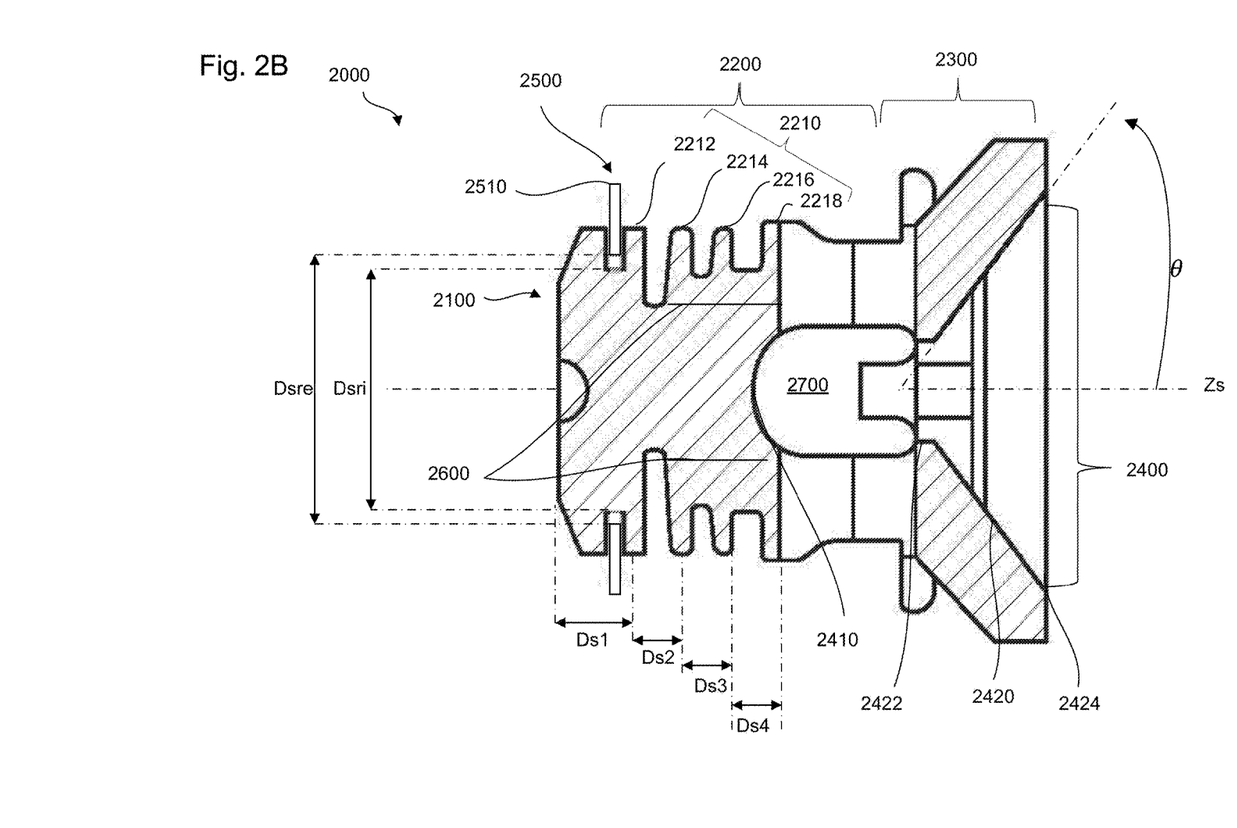
FIG. 2B is a first sectional view of the socket of the adjustment assembly, according to certain aspects of the disclosure.
Figure 2C:
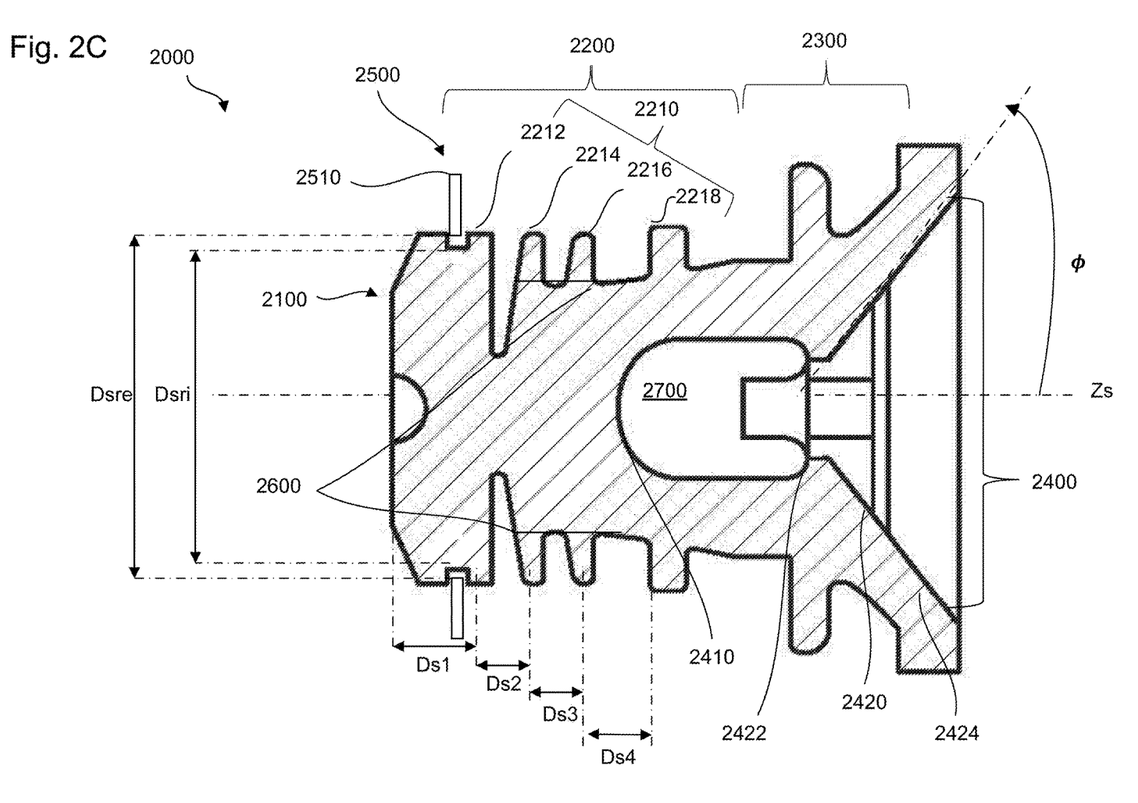
FIG. 2C a second sectional view of the socket of the adjustment assembly, according to certain aspects of the disclosure.

FIGS. 2A-2C are a perspective, a first sectional, and a second sectional views of the socket 2000 of the adjustment assembly 1000, according to certain aspects of the disclosure.

Each socket of the plurality of sockets 2000 can include a socket foot 2100, a socket body 2200 that surmounts the socket foot 2100, a socket head 2300 that surmounts the socket body 2200, and a socket cavity 2400 that opens on the socket head 2300.

The socket body 2200 and/or the socket head 2300 can be partially or totally inserted into a bracket housing 4100 while the socket cavity 2400 can partially receive the connector 3000 to connect the bracket 4000 to the support 6000 and to provide the articulation point between the socket 2000 and the connector 3000. The socket body 2200 can include a plurality of socket flanges 2210 that radially protrudes from the socket body 2200 and are positioned longitudinally along a length of the socket body 2200 to provide better grip when the socket body 2200 is inserted into the bracket 4000. For example, the plurality of socket flanges 2210 can include a first socket flange 2212 positioned at a first distance Ds1 from the socket foot 2100, a second socket flange 2214 positioned at a second distance Ds2 from the first socket flange 2212, a third socket flange 2216 positioned at a third distance Ds3 from the second socket flange 2214, and a fourth socket flange 2218 positioned at a fourth distance Ds4 from the third socket flange 2216, wherein the first distance Ds1 can be longer than the second distance Ds2, and the second distance Ds2, the third distance Ds3, and the fourth distance Ds4 can be substantially equal to each other to provide better gripping between the socket body 2200 and the articulation mechanism 5000, as illustrated in FIGS. 2B-2C.

The socket body 2200 can also include a plurality of support walls 2600 that connects the plurality of socket flanges 2210 between each other to provide support to the plurality of socket flanges 2210 and prevent the plurality of socket flanges 2210 from breaking when inserted into the bracket 4000.

In addition, the socket 2000 can include a socket ring 2500 positioned between the socket foot 2100 and the first socket flange 2212 with a socket ring edge 2510 that protrudes radially over the plurality of socket flanges 2210. The socket ring 2500 can have a predetermined play between an internal diameter Dsri of the socket ring 2500 and an external diameter Dsre of the socket body 2200 to provide supplementary gripping between the socket 2000 and the bracket 4000. When the socket 2000 is pulled from the bracket 4000, the socket ring 2500 can lodge in the articulation mechanism 5000 and prevent total extraction of the socket 2000 from the bracket 4000.

The socket cavity 2400 can include a socket seat 2410, and a socket sink 2420 with a first sink opening 2422 that opens on the socket seat 2410 and a second sink opening 2424 that opens on the connector 3000.

The socket sink 2420 can receive the connector 3000 and maintain the connector 3000 in the socket seat 2410, while the socket seat 2410 can provide the articulation point between the socket 2000 and the connector 3000. The first sink opening 2422 can be smaller than the second sink opening 2424 to maintain the connector 3000 partially inserted into the socket sink 2420, while the second sink opening 2424 can be sufficiently large to provide a predetermined spacing between the connector 3000 and the socket 2000 and allow the articulation of the connector 3000 around the articulation point.

In addition, the socket 2000 can include a pair of socket lateral openings 2700 between the socket seat 2410 and the first sink opening 2422 to provide a visual inspection so as to make sure that the connector 3000 is correctly inserted into the socket 2000.

Figure 3A:
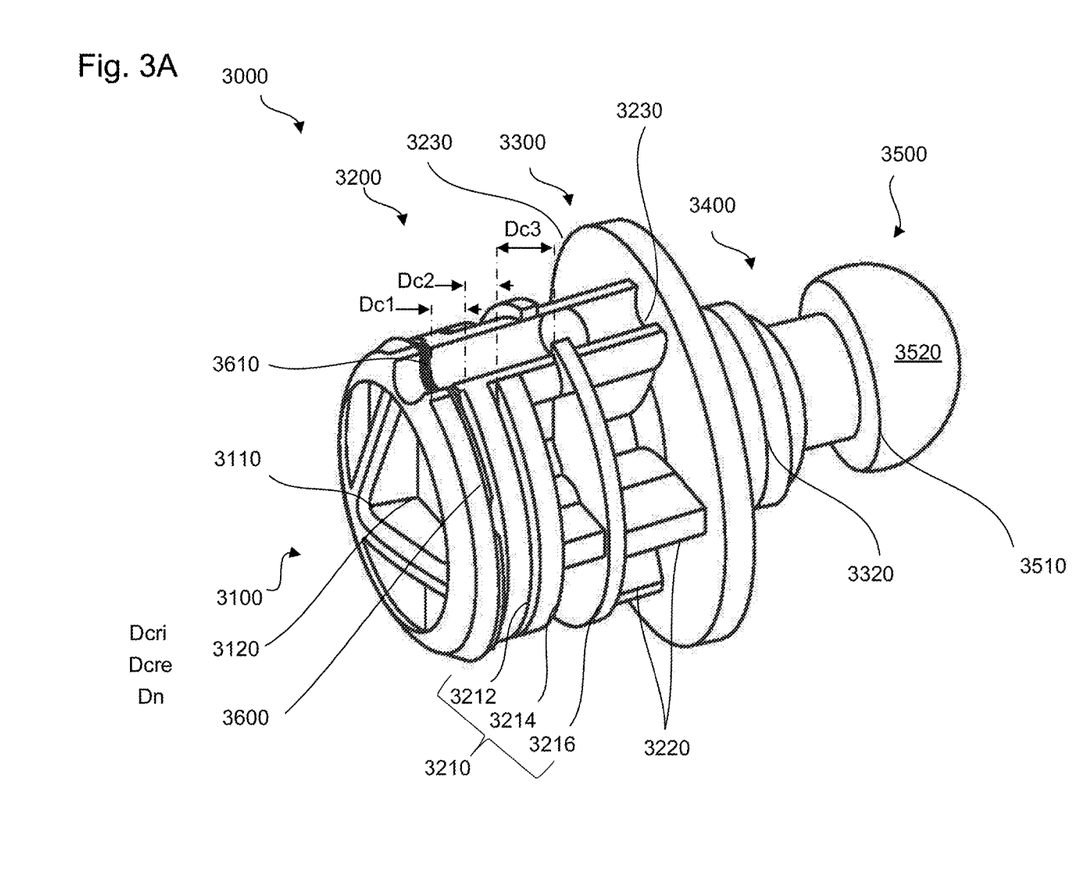
FIG. 3A is a perspective view of a connector of the adjustment assembly, according to certain aspects of the disclosure.
Figure 3B:
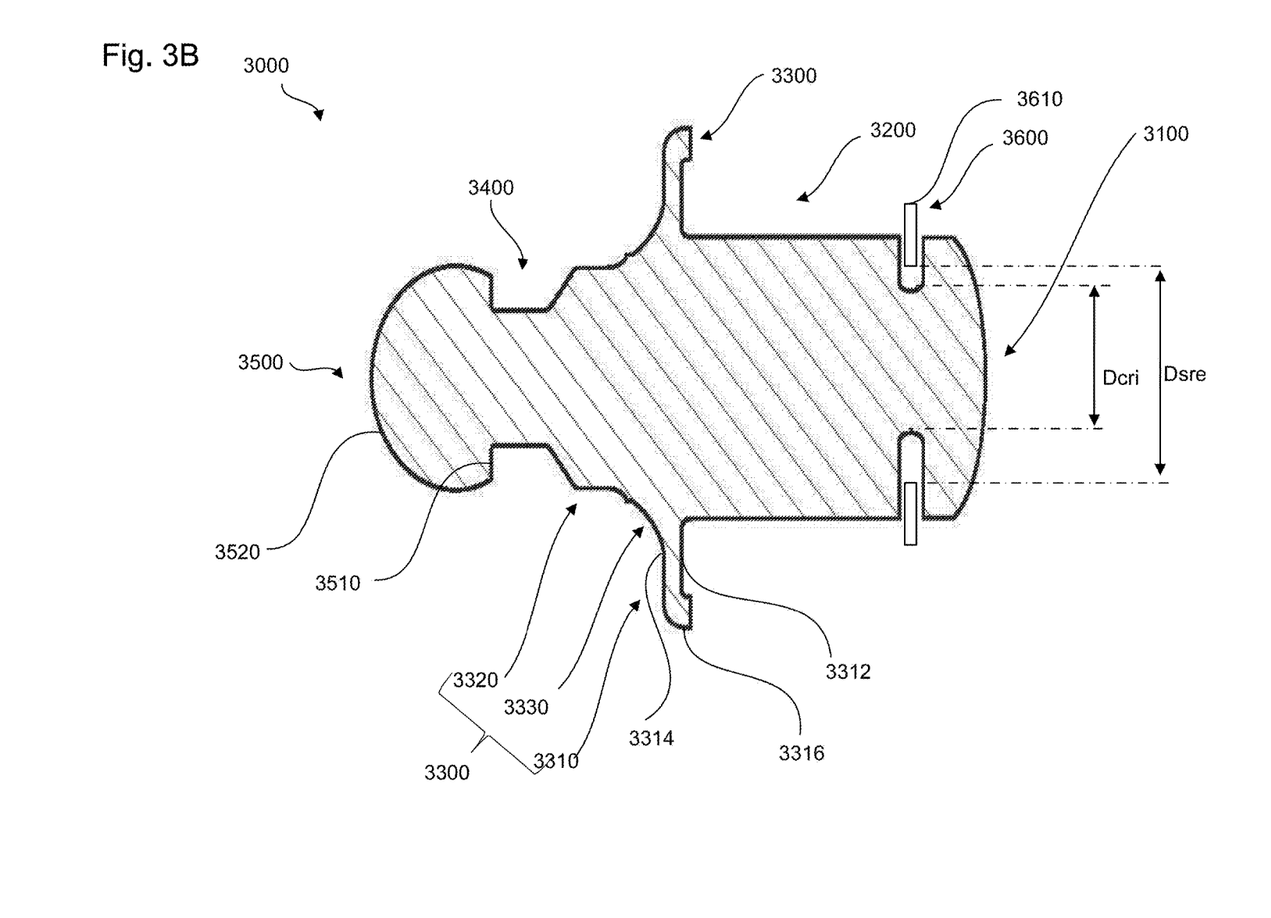
FIG. 3B is a sectional view of the connector, of the adjustment assembly, according to certain aspects of the disclosure.
Figure 3C:
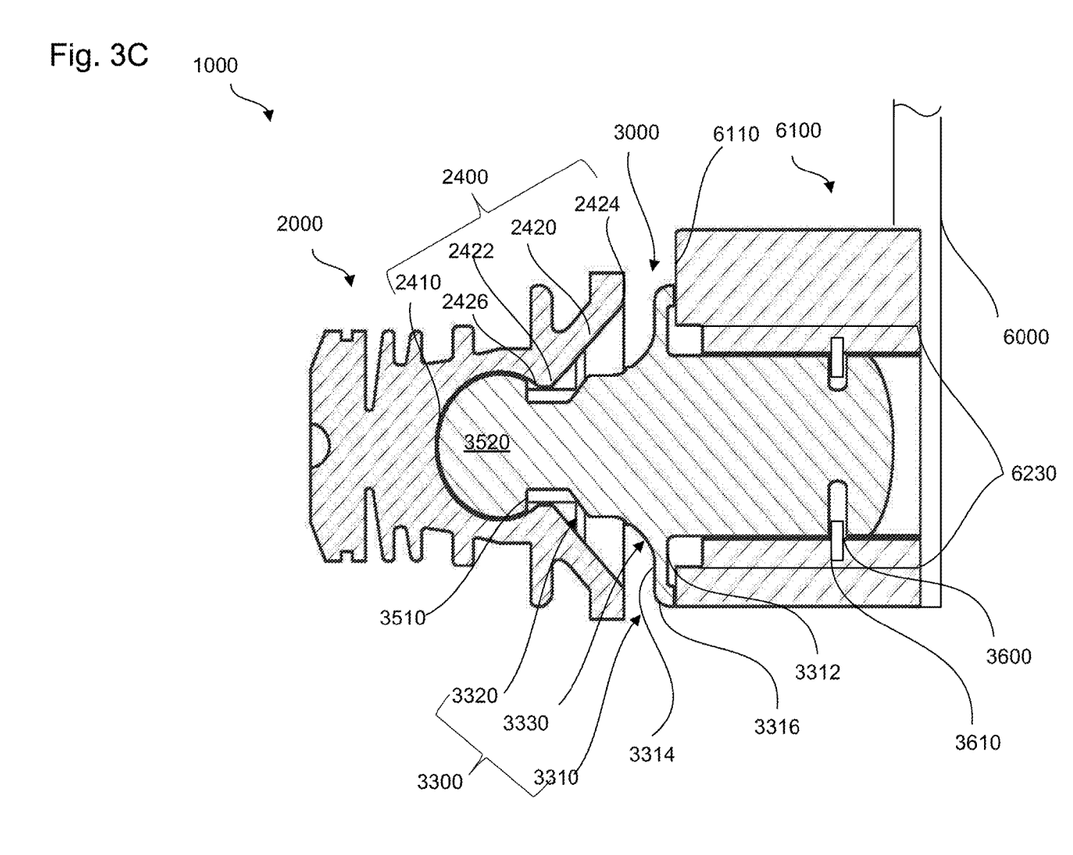
FIG. 3C is a sectional view of the connector inserted into the socket, according to certain aspects of the disclosure.

FIGS. 3A-3C are a perspective view of the connector 3000, a sectional view of the connector 3000, and a sectional view of the connector 3000 inserted into the socket 2000 and the housing support 6100, according to certain aspects of the disclosure.

Each connector of the plurality of connectors 3000 can include a connector foot 3100, a connector body 3200 that surmounts the connector foot 3100, a connector shoulder 3300 that surmounts the connector body 3200, a connector neck 3400 that surmounts the connector shoulder 3300, and a connector head that surmounts the connector neck 3400.

The connector foot 3100 and the connector body 3200 can be inserted into the support housing 6100 of the support 6000, the connector shoulder 3300 can seat on the support housing 6100, and both the connector neck 3400 and the connector head 3500 can be inserted into the socket cavity 2400 of the socket 2000 to provide articulation between the socket 2000 and the connector 3000 and thus between the bracket 4000 and the support 6000.

The connector foot 3100 can include a pair of support walls 3110 and a foot base 3120 that surmounts the pair of support walls 3110. The pair of support walls 3110 can cross each other to form a cross that support the foot base 3120. In addition, each support wall of the pair of support walls 3110 can have a semi-spheroidal shape to facilitate the insertion of the connector 3000 into the support housing 6100.

The connector body 3200 can include a plurality of connector flanges 3210 that radially protrudes from the connector body 3200 and are positioned longitudinally along a length of the connector body 3200 to provide better grip when the connector body 3200 is inserted into the support housing 6100 by the operator. For example, the plurality of connector flanges 3210 can include a first connector flange 321 positioned at a first distance Dc1 from the connector foot 3100, a second connector flange 3214 positioned at a second distance Dc2 from the first connector flange 3212, and a third connector flange 3216 positioned at a third distance Dc3 from the second connector flange 3214, wherein the first distance Dc1 can be substantially equal to the second distance Dc2, and the second distance Dc2 can be smaller than the third distance Dc3 to provide better gripping between the connector body 3200 and the support housing 6100 of the support 6000, as illustrated in FIGS. 3A-3B. For example, the first distance Dc1 and the second distance Dc2 can be at least two times smaller than the third distance Dc3.

The connector body 3200 can also include a plurality of connector support walls 3220 that connects the plurality of connector flanges 3210 between each other to provide support to the plurality of connector flanges 3210 and prevent the plurality of connector flanges 3210 from breaking and/or bending when inserted into the support housing 6100 of the support 6000.

The connector body 3200 can also include a pair of grooves 3230 that extends from the foot base 3120 up to the connector shoulder 3300 and crosses peripheral extremities of the plurality of connector flanges 3210. The pair of grooves 3230 can match a pair of support rails 6230 present on an internal surface of the support housing 6100 to assure the correct insertion of the connector body 3200 into the support housing 6100. For example, the pair of grooves 3230 can have a semi-circular profile and the pair of support rails 6230 can have a matching se circular profile that receives the pair of grooves 3230 when the connector body 3200 is inserted into the support bracket 6100.

In addition, the pair of grooves 3230 can facilitate the insertion of the connector body 3200 into the support bracket 6100 of the support 6000 by providing extraction of air that may be trapped between the connector foot 3100 and/or the connector body 3200 and the support housing 6100 when the connector 3000 is inserted into the support 6000.

In addition, the connector 3000 can include a connector ring 3600 positioned between the foot base 3120 and the first connector flange 3212 with a connector ring edge 3610 that protrudes radially over the plurality of connector flanges 3210. The connector ring 3600 can have a predetermined play between an internal diameter Dcri of the connector ring 3600, see FIGS. 1A-1B and an external diameter Dcre of the connector body 3200 to provide supplementary gripping between the connector 3000 and the support 6000. When the connector body 3200 is inserted into the bracket 4000, the connector ring 3600 can tilt within the predetermined play to limit the part of the connector ring edge 3610 that protrudes over the plurality of connector flanges 3210 and, then facilitate the insertion of the connector body 3200 into the support housing 6100. When the connector 3000 is pulled from the bracket 4000 the connector ring 3600 can tilt back to protrude above the plurality of connector flanges 3210 and have the connector ring edge 3610 gripping into the support housing 6100 and then prevent the extraction of the connector body 3200 from the support housing 6100.

Further, the connector ring 3600 can include cut out 3620 that can be aligned with the pair of grooves 3230 of the connector body 3200 to facilitate air circulation within the pair of grooves 3230.

The connector head 3500 can include a head base 3510, and a head upper portion 3520 that surmounts the head base 3510.

The connector head 3500 can be inserted into the socket cavity 2400 through the socket sink 2420 and be lodged into the socket seat 2410 to have the head upper portion 3520 in contact with the socket seat 2410 to provide articulation between the connector 3000 and the socket 2000. The head base 3510 is retained against the first sink opening 2422 to affix the connector 3000 into the socket 2000.

The head upper portion 3520 can roll and/or slip in the socket seat 2410 to provide articulation between the connector 3000 and the socket 2000 within a predetermined articulation ranges. The predetermined articulation ranges can include an polar angle $\theta$ between a connector central axis Zc and a socket central axis Zs and an azimuth angle $\phi$ between the connector central axis Zc and the socket central axis Zs. For example, the polar angle $\theta$ can be between 0° and 45°, and preferably between 15° and 30°, while the azimuth angle $\phi$ to can be between 0° and 360°, and preferably between 15° and 340°.

In addition, the socket sink 2420 can include a pair of socket teeth 2426 that protrudes radially towards each other within the first sink opening 2422 and maintains the connector head 3500 against the socket seat 2410.

The connector shoulder 3300 can include a shoulder flange 3310, a shoulder boss 3320 that surmounts the shoulder flange 3310, and a shoulder chamfer 3330 that connects the connector neck 3400 to the connector shoulder 3300.

The shoulder flange 3310 can include a first shoulder surface 3312, a second shoulder surface 3314 opposite to the first shoulder surface 3312, and an edge shoulder surface 3316 that connects the first shoulder surface 3312 and the second shoulder surface 3314. The edge shoulder surface 3316 can have a rounded shape to provide a smooth connection between the connector 3000 and the support 6000. The first shoulder surface 3312 can be substantially flat with an annular shape to tightly seats on a housing bore 6110 of the support housing 6100. The second shoulder surface 3314 can have a flared shape that connects the shoulder boss 3320 and the edge shoulder surface 3316 to facilitate the articulation of the connector 3000 inside the socket sink 2420 between the first sink opening 2422 and the second sink opening 2424. In addition, the flared shape of the second shoulder surface 3314 can provide ergonomic comfort for the operator holding the connector 3000 between his or her fingers when inserting the connector body 3200 into the support housing 6100.

The shoulder boss 3320 with the shoulder chamfer 3330 can provide support between the connector shoulder 3300 and the connector neck 3400.

The connector neck 3400 can extend between the shoulder chamfer 3330 and the head base 3510 and have a cylindrical shape with a neck diameter Dn smaller than the first sink opening 2422 to facilitate the articulation of the connector neck 3400 inside the socket sink 2420.

Figure 4:
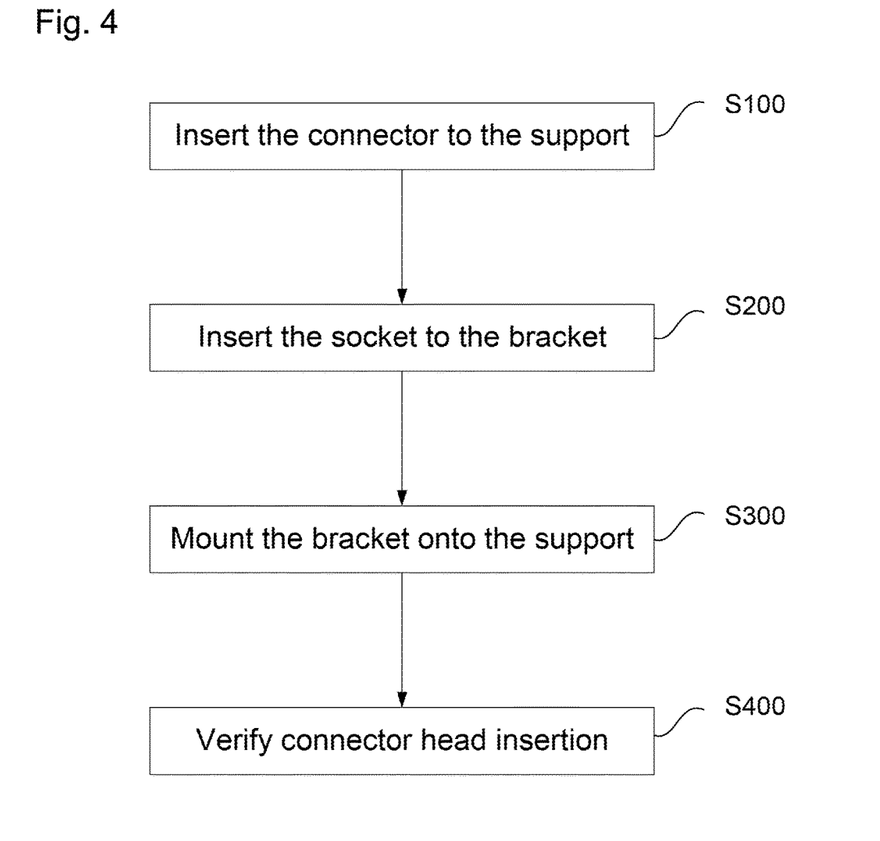
FIG. 4 is a flow chart of a method for articulatably mounting the adjustment assembly via the connector, according to certain aspects of the disclosure.

FIG. 4 is a flow chart of a method for articulatably mounting the adjustment assembly 1000 via the connector 3000, according to certain aspects of the disclosure.

In a step 100, an operator can insert each connector of the plurality of connectors 3000 onto the support 6000.

The operator can place the connector foot 3100 in front of the support housing 6100 of the support 6000 and align the pair of grooves 3230 of the connector 3000 with the support pair of rails 6230 of the support housing 6100. Then, the operator can push in the connector body 3200 into the support housing 6100 until the first shoulder surface 3312 of the connector shoulder 3300 contacts the support housing bore 6110 of the support housing 6100.

In a step 200, the operator can insert each socket of the plurality of the sockets 2000 onto the bracket 4000.

The operator can place the socket foot 2100 in front of the bracket housing 4100 of the bracket 4000 and push in the socket body 2200 into the housing bracket 4100 until the socket head 2300 contacts the housing bore 4110 of the bracket housing 4100.

In a step 300, the operator can mount the bracket 4000 onto the support 6000 by inserting each connect 3000 onto each socket 2000.

The operator can place the connector head 3500 inside the socket sink 2420, between the first sink opening 2422 and the second sink opening 2424. Then, the operator can push in the connector head 3500 to pass the pair of teeth 2426 of the socket sink 2420 and contact the head upper portion 3520 of the connector head 3500 with the socket seat 2420 of the socket 2000.

In a step 400, the operator can verify that the connector head 3500 is correctly inserted in the socket seat 2420 by performing a visual inspection through the pair of socket lateral openings 2700.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. An adjustment assembly to support vehicle lights, comprising:
    a bracket that supports the vehicle lights with a plurality of bracket housings;
    a support structure that articulatably supports the bracket with a plurality of support housings;
    a plurality of sockets that is inserted into the plurality of bracket housings, each socket of the plurality of sockets including:
    a cavity seat, and
    a cavity sink that opens on the cavity seat; and
    a plurality of connectors that articulatably connects the plurality of sockets and the plurality of support housings, each connector of the plurality of connectors including:
    a connector body,
    a connector neck that protrudes from the connector body, and
    a connector head that surmounts the connector neck, wherein
        the connector head is manually insertable into the cavity seat to provide an articulation point,
        the neck articulates within the cavity sink through the articulation point, and
        the connector body is manually insertable into each support housing of the plurality of support housings.

2. The adjustment assembly of claim 1, wherein the connector body includes a plurality of connector flanges that protrudes radially from the connector body.

3. The adjustment assembly of claim 2, wherein the plurality of connector flanges includes:
    a first connector flange positioned at a first distance from a terminal end of the connector body,
    a second connector flange positioned at a second distance from the first connector flange, and
    a third connector flange positioned at a third distance from the second connector flange, wherein
        the first distance is substantially equal to the second distance the first and the second distance is smaller than the third distance to enhance gripping between the support housing and the connector body and air evacuation when the connector body is inserted into the support housing.

4. The adjustment assembly of claim 3, wherein the second distance is at least two times smaller than the third distance.

5. The adjustment assembly of claim 2, wherein the connector body further includes a plurality of support walls extending between each connector flange of the plurality of connector flanges.

6. The adjustment assembly of claim 1, wherein the connector further includes a pair of groove extending along the connector body to facilitate air evacuation when the connector body is inserted into the support housing.

7. The adjustment assembly of claim 6, wherein the connector further includes a connector ring positioned between the terminal end and a first connector flange of the plurality of flanges that enhances gripping between the support housing and the connector.

8. The adjustment assembly of claim 7, wherein the connector ring has a predetermined play between an internal diameter of the connector ring and an external diameter of the connector body that enhances gripping between the connector and the support housing.

9. The adjustment assembly of claim 8, wherein the connector ring has a ring edge substantially sharp that provides biting between the connector and the support housing.

10. An adjustment assembly to support vehicle lights, comprising:
    a bracket that supports the vehicle lights with a bracket housings:
    a support structure that articulatably supports the bracket with a plurality of support housings;
    a plurality of sockets that is inserted into the plurality of support housings, each socket of the plurality of sockets including:
    a cavity seat, and
    a cavity sink that opens to the cavity seat, and
    a plurality of connectors that articulatably connects the plurality of sockets and the plurality of support housings, the connector including:
    a connector body,
    a connector shoulder that surmounts the connector body,
    a connector neck that protrudes from the connector shoulder, and
    a connector head that surmounts the connector neck, wherein the connector head is manually insertable into the cavity seat to provide an articulation point, the neck moves within the cavity sink through the articulation point, the connector shoulder is seatable on each support housing of the plurality of support housings, and the connector body is manually insertable into the support housing.

11. The adjustment assembly of claim 10, wherein the connector body includes a plurality of connector flanges that protrudes radially from the connector body.

12. The adjustment assembly of claim 11, wherein the plurality of connector flanges includes:

a first connector flange positioned at a first distance from a terminal end of the connector body, a second connector flange positioned at a second distance from the first connector flange, and a third connector flange positioned at a third distance from the second connector flange, wherein the first distance is substantially equal to the second distance the first and the second distance is smaller than the third distance to enhance gripping between the support housing and the connector body and air evacuation then the connector body is inserted into the support housing.

13. The adjustment assembly of claim 10, wherein the connector further includes a pair of groove extending from a terminal end of the connector body up to the shoulder to facilitate air evacuation when the connector body is inserted into the support housing.

14. The adjustment assembly of claim 10, wherein the connector shoulder has a first surface substantially flat that seats on a bore of the support housing and stops the insertion f the connector body into the support housing.

15. The adjustment assembly of claim 14, wherein the connector shoulder has a second surface opposite to the first surface that has a flared shaped to provide ergonomic comfort when an operator inserts the connector into the support housing.

16. An adjustment assembly to support vehicle lights, comprising:

a bracket that supports the vehicle lights with a plurality of bracket housings;

a support structure that articulatably supports the bracket with a plurality of support housings;

a plurality of sockets that is inserted into the plurality of bracket housings, each socket of the plurality of sockets including:

a cavity seat, and a cavity sink that opens to the cavity seat; and a plurality of connectors that articulatably connects the plurality of sockets and the plurality of support housings, each connector of the plurality of connectors including:

a connector foot, a connector body that surmounts the connector foot, a connector shoulder that surmounts the connector body, a connector neck that protrudes from the connector shoulder, and a connector head that surmounts the connector neck, wherein the connector head is manually insertable into the cavity seat to provide an articulation point, the neck moves within the cavity sink through the articulation point, the connector shoulder is seatable on each support housing of the plurality of support housings, and the connector foot and the connector body are manually insertable into the support housing.

17. The adjustment assembly of claim 16, wherein the connector body includes a plurality of connector flanges that protrudes radially from the connector body.

18. The adjustment assembly of claim 17, wherein the plurality of connector flanges includes:

a first connector flange positioned at a first distance from the connector foot, a second connector flange positioned at a second distance from the first connector flange, and a third connector flange positioned at a third distance from the second connector flange, wherein the second distance is higher than the first and the third distance is higher than the second distance to enhance gripping between the bracket housing and the connector body and air evacuation when the connector body is inserted into the support housing.

19. The adjustment assembly of claim 16, wherein the connector foot includes a pair of support walls that cross each other and provides support for the connector foot.

20. The adjustment assembly of claim 19, wherein each support wall of the pair of support wall has a semi-spheroidal shape to facilitate the insertion of the connector into the support housing.

* * * * *